Nov. 15, 1949 V. E. PRATT ET AL 2,488,142
APPARATUS FOR AUTOMATICALLY PROCESSING FILM
Original Filed Oct. 28, 1943 3 Sheets-Sheet 1

INVENTORS.
VERNEUR E. PRATT
GEORGE F. GRAY
DANIEL E. REED
BY
ATTORNEYS.

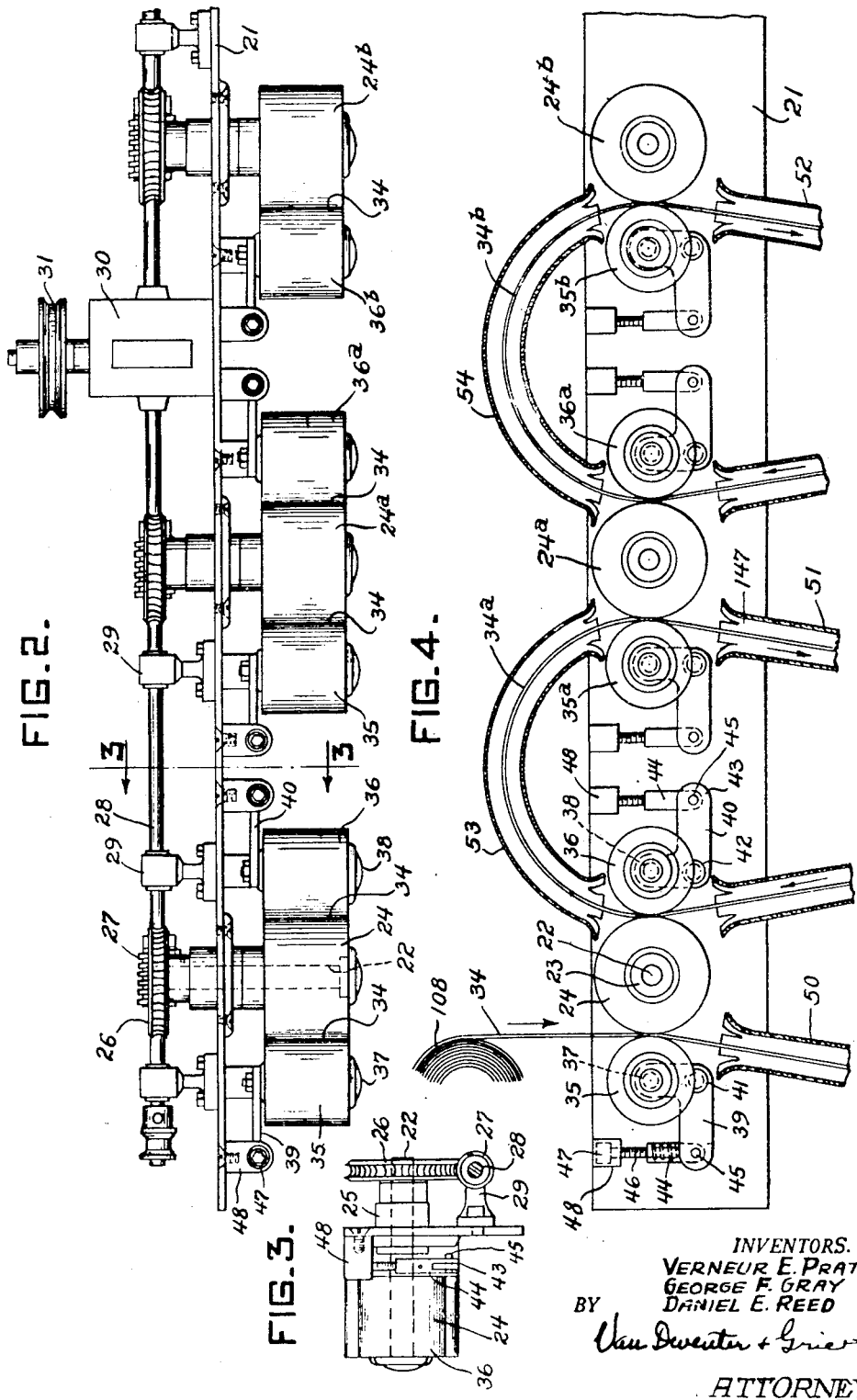

INVENTORS.
VERNEUR E. PRATT
GEORGE F. GRAY
BY DANIEL E. REED

ATTORNEYS.

Patented Nov. 15, 1949

2,488,142

UNITED STATES PATENT OFFICE 2,488,142

APPARATUS FOR AUTOMATICALLY PROCESSING FILM

Verneur E. Pratt, George F. Gray, and Daniel E. Reed, Norwalk, Conn.; said Gray and Reed assignors to said Pratt Original application October 28, 1943, Serial No. 507,938. Divided and this application January 9, 1946, Serial No. 640,000

8 Claims. (Cl. 271—2.3)

This invention relates to improvements in apparatus for automatically processing film and is directed more particularly to apparatus for feeding film through mediums for processing the same. This application is a division of application Serial 507,938, filed October 28, 1943, now Patent 2,428,681, dated October 7, 1947.

One object of the invention is the provision in film processing apparatus of a film feeder adapted to push or propel the film through ducts or the like containing processing fluids, without the necessity of having to secure the film to a leader festooned about a series of rollers as has been heretofore customary.

A further object of the invention is the provision in a film feeding device of roller means between which the end of the film may be inserted, said roller means being adapted to push the film into a duct and said roller means being also adapted to engage the film and withdraw it from the duct, thence to direct it to other roller means for pushing it through other ducts.

Another object of the invention is the provision of film feeding means which includes a drive roller having a deformable face engaging the film as it enters and leaves the duct whereby said film is removed from the duct at substantially the same rate it is fed into said duct.

Another object of the invention is a provision in film feeding apparatus of roller means comprised of three rollers in each group, the intermediate roller comprising a driving member and carrying a deformable rim, contact between said intermediate roller and the other rollers being adjustable and adapted to be calibrated to deliver a film into a duct and to remove it therefrom at substantially the same rate.

Other objects and advantages of the invention will be apparent to those skilled in the art upon the study of the following specifications and the accompanying drawings:

Figure 2 is a transverse sectional view of the apparatus on the line 2—2, Figure 1.

Figure 3 is a sectional view on the line 3—3, Figure 2.

Figure 4 is an enlarged diagrammatic view of the roller feed mechanism, Figure 3.

Figure 1:
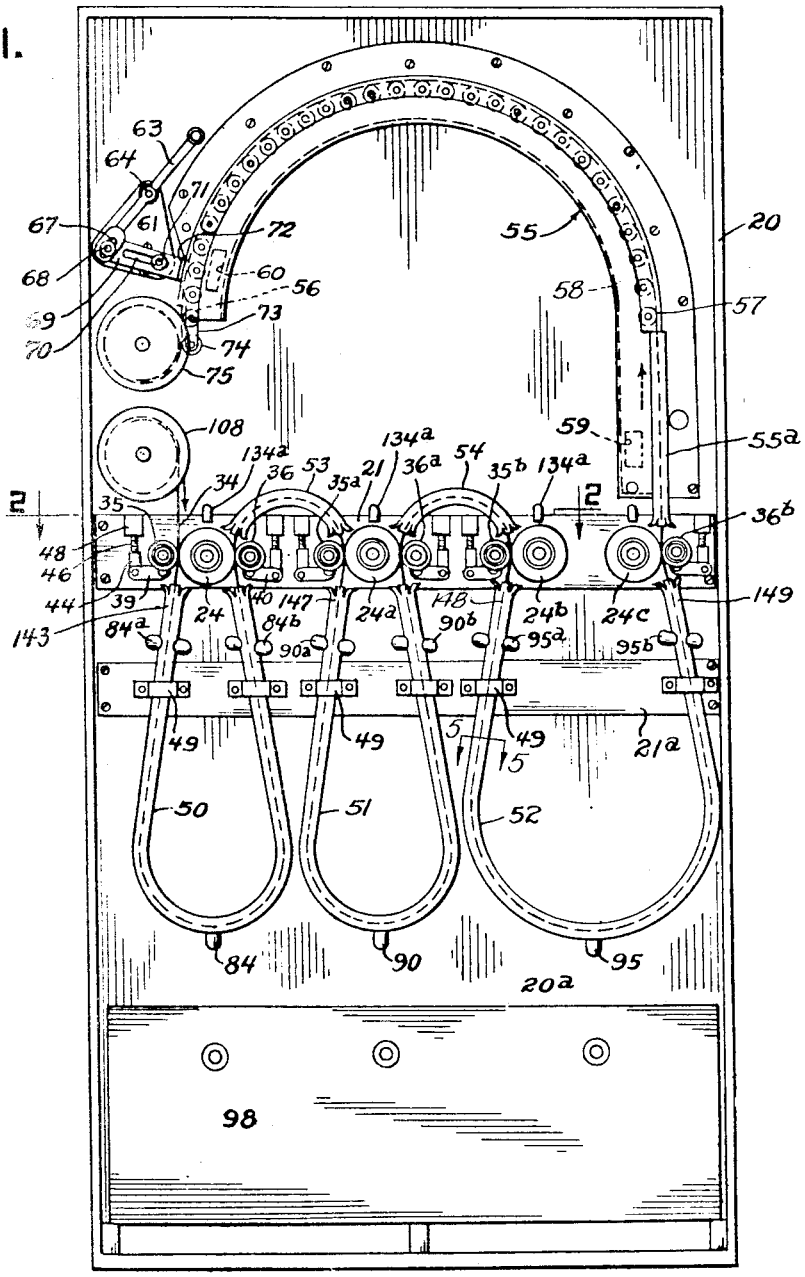
Figure 1 is a front elevation of a preferred form of the apparatus with the door open to reveal the interior thereof.

Referring to Figure 1, the numeral 20 denotes a casing or cabinet having a door (not shown) which may be hinged or otherwise secured thereto in any suitable manner, in order to form, with the casing, a light tight box.

Secured in the casing in any suitable manner is a mounting plate 21 on which are assembled the guide and feed rollers as shown in Figures 1 to 4 inclusive. As each set of rollers is the same in construction and operation, only one set will be described in detail.

Referring more particularly to Figure 4, it will be seen that a feed roller is composed of a driving shaft 22 having a rigid supporting member 23 secured thereto, carrying an outer shell of resilient deformable material 24 of rubber or the like.

The driving shaft 22 is supported in the bearing 25 in plate 21 and the shaft on its rear end carries a worm wheel 26 adapted to be rotated by a worm 27 on worm shaft 28, said shaft being mounted in suitable bearing brackets 29 supported on plate 21. The shaft 28 extends along the rear of the three roller assemblies as shown in Figure 2, passing through a gear reduction box 30 supported on mounting plate 21, said gear reduction is provided with a driving pulley 31, which via the belt 32 or any other suitable means, is connected to the film driving motor 33 so that when the motor is in operation shaft 23 is revolved to turn all of the feed rollers in counter-clockwise direction at the same speed to move the film 34 engaged thereby lineally into the baths as hereinafter described.

Each of the feed rollers 24 is engaged by a pair of guide rollers 35, 36 having an outer surface of rubber or other resilient deformable material, the film 34 being interposed between guide and feed rollers as shown in the figures. The rollers 35, 36 are supported on shafts 37, 38 on which they are free to turn. These shafts are secured to the arms 39, 40 which are supported on the bearing brackets 41, 42 about which these arms are free to move. The outer ends of arms 39, 40 are forked as shown at 43 in Figure 3 to engage the adjusting members 44 movably secured in the arms by pins 45. These members are threaded to receive the lower threaded ends of bolts 46 having socket heads 47 and supported free to turn in the abutments 48. By applying a socket wrench to the sockets 47, and thereby revolving the bolts 46, the rollers, for example 35, may be moved away from or toward the roller 24 and the resilient surfaces of the rollers 24 and 35 deformed in a manner to be presently described for the purpose of compensating for the linear or longitudinal elongation of the film which accurs when the film is wetted.

Referring to Figure 1, a support 21ª is secured to the casing 20 in any suitable manner, and, by clamping means as shown at 49, the ducts 50, 51, 52 are secured thereto in position so that their upper ends are positioned subjacent the feed and guide rollers as shown in Figures 1 to 4. Additional ducts 53, 54 may be secured to the plate 21 to enclose the loops 34ª, 34ᵇ of the film 34 where same extends over the top of the rollers as shown.

Immediately above the last feed roller on the right, Figure 1, is mounted the dryer 55. This may consist of a short section of duct 55ª surrounding the film 34 where it emerges from the last feed roller. The film then passes over a plurality of rollers 56 supported on a curved flexible metallic track member 57 suitably supported on 55 so that its left end is movable as later described, and forming an arcuate drying track for the film. This track is enclosed by a casing 58 forming a duct whereby air may be confined in contact with the film and circulated about the same to dry it as hereinafter described, this casing 58 having entrance and exit ducts 59, 60 for the air. Near the discharge end of the dryer and attached to the track member 57 thereof, is a take-up mechanism and control switch. This may be mounted on the rear wall of the cabinet and may include a bracket 61 supported thereon and includes a hand lever 63 free to move about the screw 64 securing same to the shaft 65 which extends through the upper bushing and through the rear wall of the cabinet.

The end 66 of lever 63 is slotted as shown at 67. A pin 68 passes through this slot and is secured in the arm 69 which has a slot 70 receiving pin 71 mounted on the bracket 61.

Secured to the arm 69 is a member 72 attached to the dryer track member 57 carrying rollers 56. The track extends downwardly as shown at 73 and carries at its lower extremity the grooved roller 74.

A take-up reel 75 is driven in the usual manner and has a plurality of hooks in its periphery adapted to grasp the usual holes in the leader strip or end of film 34.

The arrangement and construction of the take-up adjustment just described is such that by moving the lever 63 to the right, Figure 1, the film track and film is moved toward reel 75 so that hooks therein can engage the film and wind it up on the reel when, in the course of operation of the device the leading end of the film emerges from the dryer adjacent the reel 75.

When the lever 63 is moved to the left, Figure 1, the film track, and consequently the film, is moved away from the take-up reel and consequently the leading end of the film will not be engaged thereby.

Since the take-up device forms no part of the present invention, and since it is shown and described in copending application Serial No. 613,650, filed August 30, 1945, for Take-up reel systems, it is believed that no detailed description is necessary in the present application.

A feed roll 108 is rotatably supported on the rear wall 20ª and carries a supply of film 34 which is fed through the apparatus as presently described.

Figure 5:
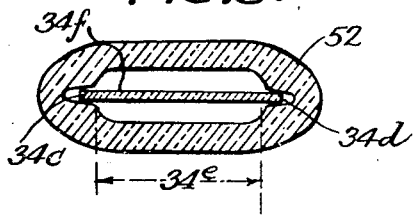
Figure 5 is a view on the line 5—5, Figure 1.

The film ducts, particularly those designated by the numerals 50 to 52 inclusive, may be made of plastic material such as Lucite and preferably have the cross-section shown in Figure 5 so that only the edges 34ᶜ, 34ᵈ of the film are in contact with the inner walls of the ducts, particular care being taken that the image-receiving center portion of the film indicated at 34ᵉ be held out of contact with the ducts.

The speed at which the film passes through the ducts 50, 51, 52 is such that the loops 34ᶠ (and particularly this loop in duct 50) hangs as free as possible within the U of the duct. However, as soon as the downwardly moving entering end of film 34 encounters the liquid in duct 50, the film starts to elongate. This rate of elongation may be 1/54 inch to the lineal foot or more. As the feed rollers 24, 24ª, 24ᵇ, 24ᶜ are all moving at the same speed, the film, as it grows longer within duct 50 will buckle and tend to rub on the lower inner surface 50ª of the duct. It may also crumple at any point within the duct between the entrance and exit thereof.

To compensate for this "growing" of the film, or increase in length, by having the exit feed roller run faster than the entrance roller (which might be attempted as apparently obvious) not only necessitates a complete and independent set of feed and guide rollers and drives at the entrance and exit mouths of at least duct 50, but also introduces obvious mechanical complications of a serious nature both expensive and difficult to overcome, particularly in connection with adjustments while running.

By the following method, the "growing" of the film while in the liquid bath is easily compensated for and the film may be correctly positioned in the ducts while the apparatus is in operation.

Assuming that the guide rollers 35 and 36 are 1½ inches in diameter and that the feed roller 24 is 2⅛ inches in diameter, and all the rollers are ¾ inch wide, the guide rollers 35 and 36 having outer resilient portions ⅜ inch thick and the roller 24 having an outer resilient portion or rim ⅛ inch thick, the resilient material being similar to an ordinary automobile tire casing and the rollers being arranged as shown in Figure 4.

Figure 6:
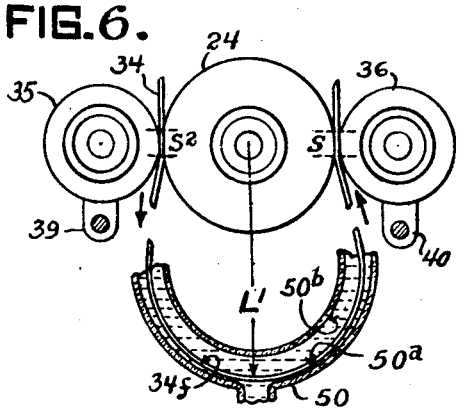
Figure 6 is a diagrammatic view of the film adjusting mechanism shown in the preceding figures, in one position.

Referring to Figure 6, it will be assumed that the tension on the rollers 35 and 36 is such that the film has elongated in developer duct 50 until the loop 34ᶠ of the film has moved out of its normal position between the inner walls 50ª, 50ᵇ of the duct and is rubbing upon the bottom wall 50ª. In other words, the film has "grown" while in the developer solution and it is desired to restore it to its normal position.

Figure 7:
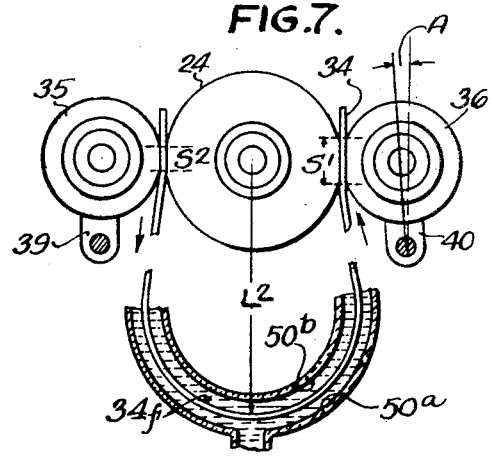
Figure 7 is a view similar to Figure 6 with the mechanism in another position.

Referring now to Figure 7, the guide roller 36 is adjusted as previously described and is moved toward the roller 24, the center of 36 being moved through the angle A. This compresses the film 34 between rollers 24 and 36 because of the resiliency of these rollers which, instead of contacting the film across the very short space indicated at S, in Figure 6, now contact it over the space S₁, Figure 7, while the contact S₂ space, Figures 6 and 7, remains the same. The result is that the upwardly moving right hand leg of the film 34 is removed from the duct faster than the film in the left hand leg enters, so that the loop 34ᶠ thereof is moved upwards out of contact with the inside surface 50ª of the duct. When in contact with 50ª the length of the loop from the shaft of roller 24 is as shown at $L_1$ in Figure 6. When the loop is in the proper position midway in the duct as shown in Figure 7, then it is at the distance $L_2$, Figure 7.

It will be seen from the foregoing that by adjusting the guide rollers such as 35 and 36 in relation to the feed roller 24, while only a single feed roller is employed in connection with each one of the ducts, this feed roller is made to feed the film lineally downward at a different rate of speed from the upward feed of the film, or vice versa, and that by adjusting the rollers 35, 36, the loop 34ᶠ is maintained in the proper position between the walls 50ᵃ, 50ᵇ of the duct 50. Of course, this method of adjustment can be applied to the rollers feeding ducts 51 and 52. It will be understood the Figures 6, 7 are diagrammatic in respect to the amount of "squeeze" between the rollers, and also in regard to the position assumed by the loops 34ᶠ and are merely illustrative of the peculiar result accomplished by "squeezing" the feed and drive rollers together as described.

It will also be understood that this method of obtaining what is in effect two speeds from the same drive pulley is not brought about at any time by slippage of the film at the feed roller. At all times the film is positively driven, the tension on the guide rollers being sufficient to insure this at all times, the difference in the rate of speed obtained by driving the film on opposite sides of the drive pulley being obtained entirely by the different amount of pressure or the "squeeze" of each feed roller against this pulley, which "squeeze" may be regulated while the apparatus is in motion.

*Operation*

The leading end of film 34 on reel 108 is now pushed between rollers 35 and 24 which feed it into the open end 143 of duct 50. The driving motor having been energized, film 34 continues downward in duct 50, passes up the right leg of same, enters between rollers 24 and 36, passes through inverted duct 53 and down between rollers 24ᵃ and 35ᵃ, below the right end of this duct. While in duct 50, the film is subject to the action of the developer therein.

After passing rollers 24ᵃ, 35ᵃ the film enters the left leg of duct 51 at 147, passes through duct 51 where it is subjected to the hardening solution therein and emerges therefrom, passing between rollers 24ᵃ and 36ᵃ, passes through inverted duct 54, between rollers 35ᵇ and 24ᵇ, and enters the left hand leg of duct 52 at 148. In duct 52 the film is washed and emerges at the upper right leg 149 thereof, passes between rollers 24ᶜ and 36ᵇ and passes upwardly into the dryer, as shown in Figure 1. The film passes upwardly through the dryer and is dried therein.

When the leader end of the film reaches the take-up reel 75 it is engaged and wound thereon as previously described and the process of developing, hardening, washing, drying and winding continues until the terminal end of the film is reached.

Although we have herein shown and described by way of example one form of our new and improved film feeding apparatus, as employed in a film processor, it is obvious that many changes may be made in the arrangements herein shown and described within the scope of the appended claims.

What is claimed is:

1. In a film feeding mechanism, a drive roller having a resilient film-engaging surface, a pair of rollers each having a resilient film engaging surface adapted to force said film into contact with said drive roller along two spaced lines of contact with a free loop of film therebetween, and means for positively and individually adjusting at least one of said rollers to vary the pressure of same on the roller with which it is in contact for changing the length of said loop.

2. In a film feeding mechanism, a drive roller having a resilient film-engaging surface, a guide roller having a resilient film-engaging surface, a film gripped between said rollers, a second guide roller having a resilient film-engaging surface, said film being engaged thereby and by said drive roller and having a free loop between points of engagement by said first and second guide rollers, and screw means for adjusting the pressure of at least one of said guide rollers on said drive roller to vary the pressure of same on said film and thereby change the length of said loop.

3. In apparatus for feeding film, a feed roller having a resilient film engaging surface, a pair of guide rollers, each having a resilient film-engaging surface, a film gripped between all said rollers and having a free loop formed between said guide rollers, and screw means for adjusting at least one of said guide rollers to relatively vary the pressure between it and said drive roller where said film is engaged thereby.

4. In apparatus for feeding film, a feed roller having a resilient film engaging surface, a pair of guide rollers, each having a resilient film-engaging surface, a film gripped between all said rollers with a free loop formed between said guide rollers, and means for adjusting at least one of said guide rollers to relatively vary the pressure between it and said feed roller where they engage said film, whereby the resilient surfaces carried thereon are deformed with said film therebetween and the rate of movement of the latter is altered to change the length of said free loop.

5. In apparatus for feeding film, a feed roller having a resilient film engaging surface, a pair of guide rollers spaced apart from each other and having resilient film engaging surfaces, a film gripped between all said rollers and having a free loop formed therein in the space between said guide rollers, and means for positively adjusting at least one of said guide rollers to relatively vary the pressure between it and said feed roller where they engage said film for varying the length of said free loop, the space between said guide rollers being such that they contact said drive roller at substantially diametrically opposite points.

6. In film processing apparatus a drive roller, a guide roller, a film between said rollers, a vertical substantially U-shaped duct for containing a processing fluid and into which said film is fed by said rollers, a second guide roller positioned adjacent the exit end of said duct and gripping said film and holding said film in contact with said drive roller, and means for positively adjusting at least one of said guide rollers relative to said drive roller, whereby the rate of linear speed at which said film is withdrawn from said duct can be varied relative to the speed at which it enters the same, said drive roller and said adjustable guide roller having resilient film engaging surfaces.

7. In film processing apparatus, a duct for containing processing fluid, means located adjacent the ends of said duct for feeding a loop of film into and removing it from said duct, said means including a drive roller having a deformable face engaging said film as it enters and leaves said duct, and a pair of pressure rollers also having deformable faces and opposed to said pressure roller at points where same engages said film for adjusting the amount of deformation of said deformable faces in contact with the film whereby the length of the film therebetween may be controlled.

8. In film feeding apparatus, a support, a feed roller having a resilient film engaging surface, a pair of guide rollers contacting opposite points on the periphery of said feed roller and also having resilient film engaging surfaces, a film gripped between all said rollers and having a free loop formed therein depending from the points of contact between said guide rollers and said feed roller, a second feed roller on said support, spaced apart from said first rollers and driven at the same rate of speed as said first feed roller, a second pair of guide rollers contacting opposite points on the periphery of said last feed roller and also having resilient film engaging surfaces, said film forming an upwardly directed free loop between said first feed and guide rollers and said second feed and guide rollers and having a second free loop depending from the points of contact between said last feed roller and said second guide rollers, all said guide rollers being adapted to be positively adjusted to relatively vary the pressure between them and their cooperating feed roller where they engage said film for varying the lengths of said free loops.

VERNEUR E. PRATT.
GEORGE F. GRAY.
DANIEL E. REED.

REFERENCES CITED

The following references are of record in the file of this patent:

UNITED STATES PATENTS

| Number | Name | Date |
|---|---|---|
| 278,777 | Crowell | June 5, 1883 |
| 1,809,830 | Cobb | June 16, 1931 |
| 2,036,835 | Sites | Apr. 7, 1936 |
| 2,085,188 | Gerlach | June 29, 1937 |
| 2,119,670 | Fitzgerald | June 7, 1938 |
| 2,123,445 | Van Leuven | July 12, 1938 |

FOREIGN PATENTS

| Number | Country | Date |
|---|---|---|
| 330,239 | Great Britain | June 2, 1930 |
| 456,884 | Great Britain | Nov. 17, 1936 |